J. B. STAMOUR.
Loom-Temple.
No. 209,101.  Patented Oct. 15, 1878.
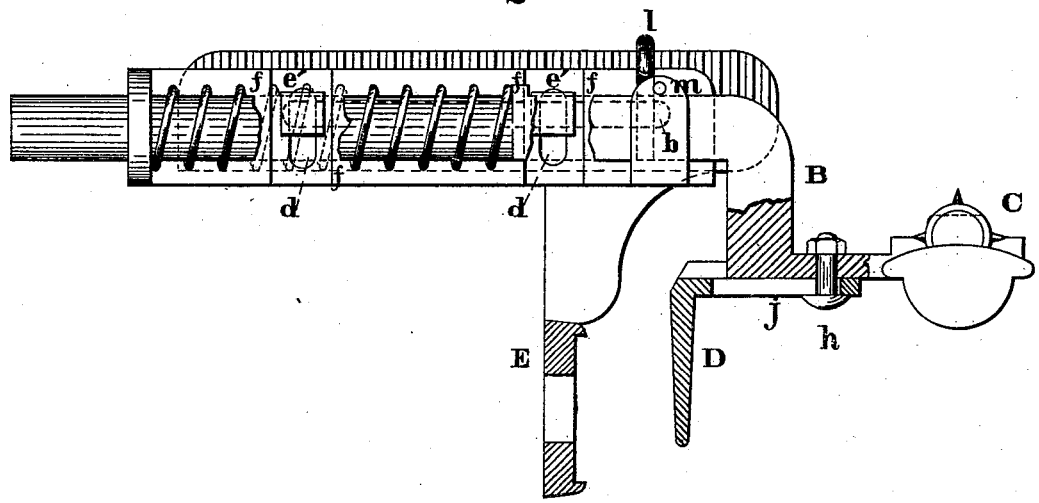
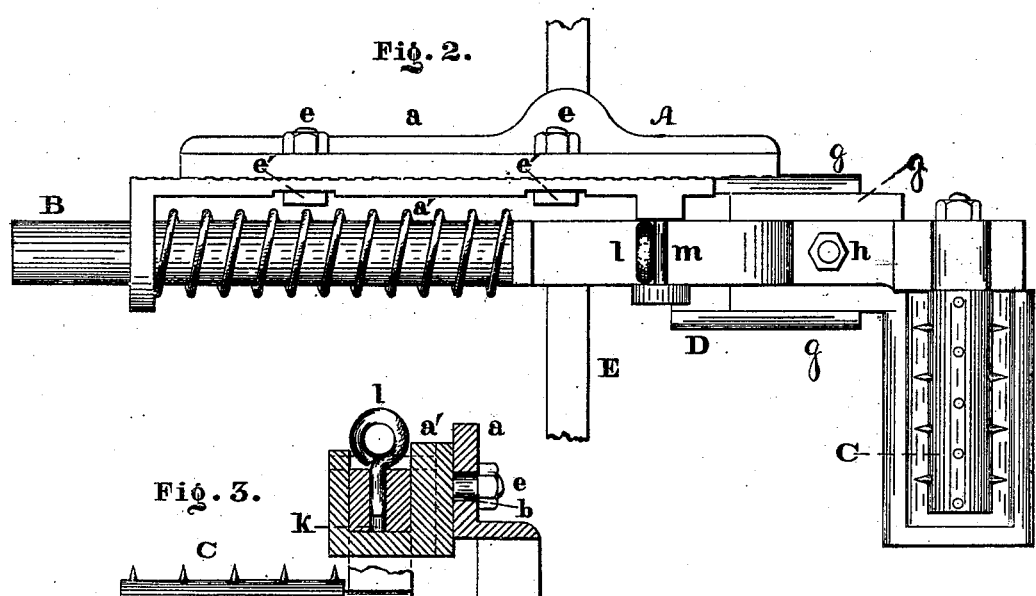
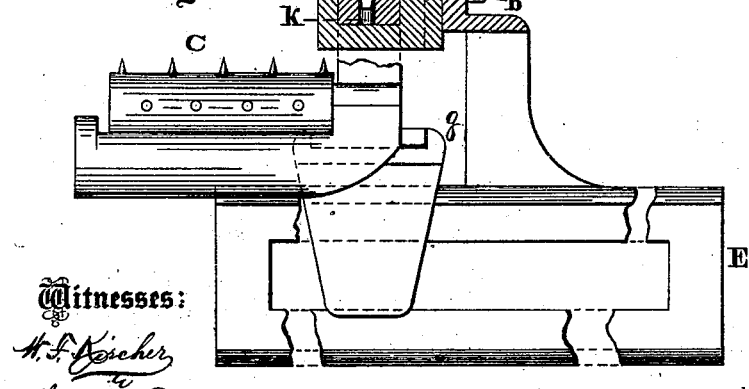
Witnesses:
H. F. Kischer
Chas. A. Burtt.
Inventor:
John B. Stamour,
by John A. Biedenstein
ATTORNEY.

UNITED STATES PATENT OFFICE.

JOHN B. STAMOUR, OF PHILADELPHIA, PENNSYLVANIA.

IMPROVEMENT IN LOOM-TEMPLES.

Specification forming part of Letters Patent No. 209,101, dated October 15, 1878; application filed July 18, 1878.

*To all whom it may concern:*

Be it known that I, JOHN B. STAMOUR, of the city and county of Philadelphia, and State of Pennsylvania, have invented a new and useful Improvement in Loom - Temples, of which the following is a specification, reference being had to the accompanying drawings, in which—

Figure 1 is a side view, partly in section, of the temple embodying my invention. Fig. 2 is a top view thereof. Fig. 3 is a front view, partly in section, thereof.

Similar letters of reference indicate corresponding parts in the several figures.

My invention consists in certain improvements in loom-temples, as hereinafter more fully set forth.

Referring to the drawings, in which the temple is shown held back, A represents the frame or support of the temple, which is formed of two parts, $a\ a'$, the part $a$ having a slot, $b$, extending horizontally and longitudinally, and the part $a'$ carrying the arm B, and having vertical slots $d$, said arm B supporting the temple-roller C. Through the slots $b\ d$ there are passed bolts $e$, whose heads $e'$ rest in recesses on the side of the part $a'$, the shoulders $f$ of said recesses preventing rotation of the bolts.

It will be seen that the temple may be adjusted relatively to the lay by properly moving the part $a'$ of the frame A on the part $a$, and then tightening the nuts of the bolt $e$, thus moving the striking-plate D toward or from the lay. The part $a'$ may also be moved vertically in the slots $d$, whereby the temple-roller may be adjusted relatively to the thickness of the fabric and degree of pressure required thereon. The contiguous faces of the parts $a$ $a'$ are serrated, for increasing the hold of said parts against each other.

From the part $a$ of the frame A there depends the plate E, by which the temple is attached to the beam, said plate being slotted, and extending transversely or at a right angle to the longitudinal direction of the arm B.

It will be seen that by means of the plate E, as arranged, the temple may be readily adjusted relatively to different widths of fabric.

The striking-plate D is formed with side flanges, $g$, which embrace the portion $g'$ of the arm B adjacent to the temple-roller, said portion being flattened or widened, and having passed through it a bolt, $h$, which enters a slot, $j$, extending longitudinally in the plate D, by means of which said plate may be adjusted relatively to the beats of the lay, and, owing to the bolt $h$ and flanges $g$, the accidental shifting of the plate is prevented. It will be noticed that the portion $g'$ occupies a position centrally of the arm B, whereby the lay is caused to strike the plate directly ahead without liability of side blows.

In the arm B there is an opening, $k$, which is so located that when said arm is set back, in order to render the temple inoperative, a pin, $l$, inserted in the opening will rest against the cross-bar or piece $m$ of the boss or guide of the arm B and hold back the arm, whereby the striking-plate D is free from contact with the lay.

Having thus described my invention, what I claim as new, and desire to secure by Letters Patent, is—

The horizontally-slotted plate $a$, having depending slotted plate E, in combination with the plate $a'$, having vertical slots $d$, and the slotted striking-plate D, substantially as described, and for the purpose set forth.

J. B. STAMOUR.

Witnesses:
JOHN A. WIEDERSHEIM,
H. E. GARSED.